United States Patent Office

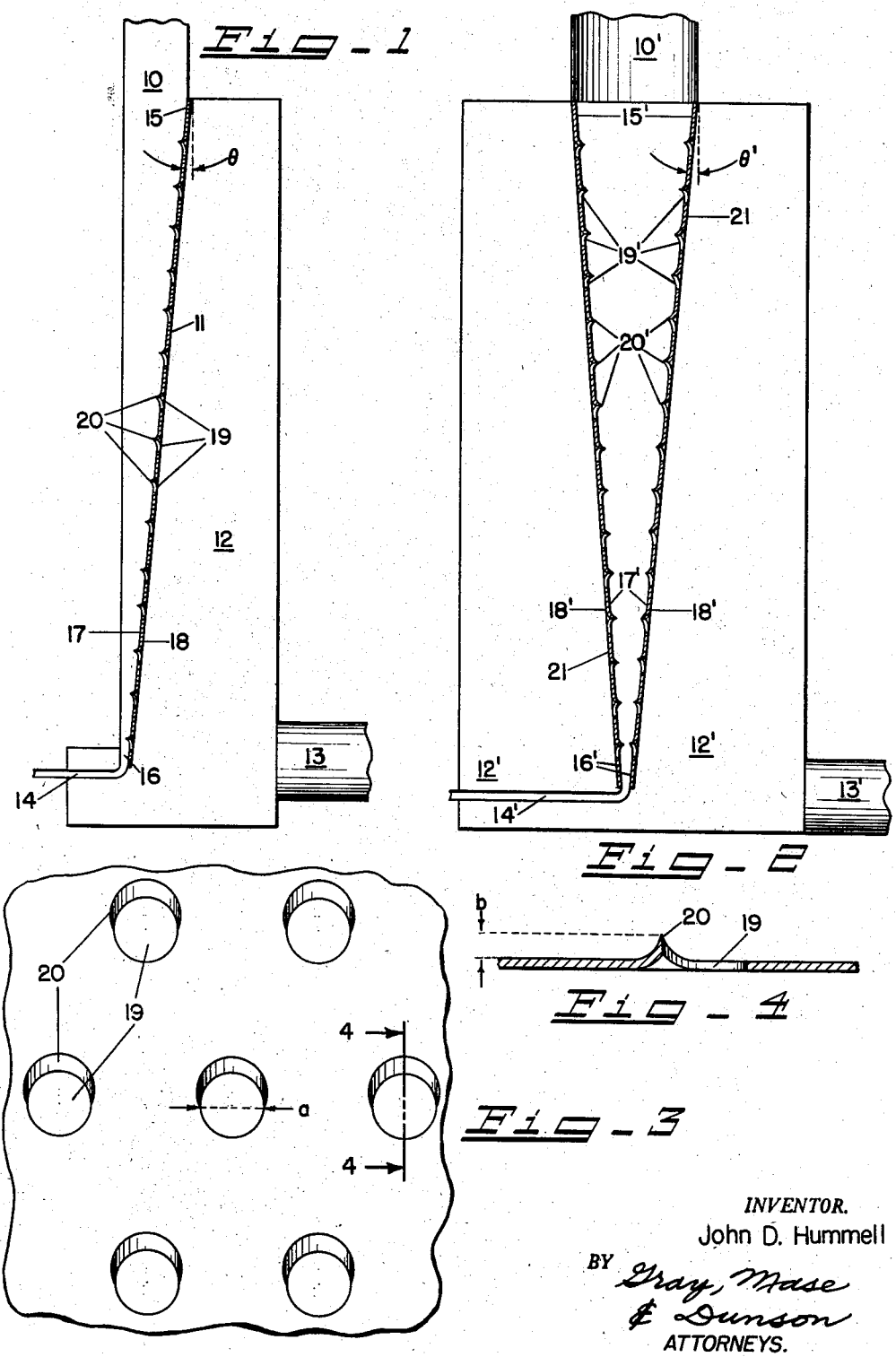

2,876,862
Patented Mar. 10, 1959

2,876,862

DUST SEPARATOR

John D. Hummell, Brice, Ohio, assignor to Battelle Memorial Institute, Columbus, Ohio, a corporation of Ohio Application October 3, 1955, Serial No. 538,100

5 Claims. (Cl. 183—105)

This invention relates to dust separators or concentrators and dust-separator elements. More particularly, it relates to self-cleaning dust-separator elements having novel features which provide improved dust concentration or separation.

The demand for more and improved dust separators has been increasing in recent times because of the public desire for a cleaner atmosphere in populated areas, and because of the increasing attention given by manufacturers to the benefits received from the use of dust-separating equipment. Experience with louver-type dust separators has indicated that they are subject to the fault of dust build-up on the faces of the louvers. This build-up results in an increase in pressure drop through the separator and eventually in complete clogging of the louvered openings. Therefore, unless the louvered separator elements are periodically cleaned, they have a very short lifetime of high efficiency. Because of the cost, the unreliability, and other disadvantages encountered in cleaning dust-separating equipment, a self-cleaning dust-separator design is sorely needed by industry.

An object of the present invention is to provide a self-cleaning dust separator.

Another object is to provide a dust separator of such design as to retain high cleaning efficiency, low pressure loss, and ease of manufacture, and yet have self-cleaning properties.

A further object of the present invention is the provision of a method of cleaning gases in which the particles removed do not clog the cleaning equipment.

Still another object is the provision of a dust-separating plate, cone, or other surface for use in a dust separator, so constructed that dust build-up on the surface is minimized, providing self-cleaning properties.

A still further object is to provide a dust-separating surface having self-cleaning and other desirable properties.

Further objects and features will be apparent from the following specification and claims.

In the drawings:

Fig. 1 is a side view in cross section of one dust-separating system according to the present invention;

Fig. 2 is a side view in cross section of a dust-separating system utilizing a truncated-cone structure as the dust-separating element;

Fig. 3 is a top view of a portion of a dust-separating plate or other surface in accordance with the present invention; and Fig. 4 is a cross-sectional view through section 4—4 of Fig. 3.

Perforated, dust-separating plates may be installed in dust separators as shown in Fig. 1 and perforated, dust-separating cones as shown in Fig. 2. The dust separator of Fig. 1 consists basically of an inlet duct 10 for dirty or particle-laden gases, a dust-separating plate 11, a clean-gas outlet chamber 12, a clean-gas outlet duct 13, and a blow-down duct 14 for carrying away the gas with a high dust concentration. The dust-separating plate 11 completely separates the inlet duct 10 and the blow-down duct 14 from the outlet chamber 12 and outlet duct 13. The dust-separating plate 11 is placed at a small angle $\theta$ (preferably 5–10 degrees) from the parallel to the inlet duct 10. The inlet duct 10 enters directly onto the plate 11 at 15 and the blow-down duct 14 is situated at the other end 16 of the plate 11, on the same side 17 of the plate 11 as the inlet duct 10. The outlet chamber 12 and outlet duct 13 are situated on the other side 18 of the dust-separating plate 11.

Particle-laden air or gas enters through the inlet duct 10 and passes through the openings or perforations 19 of the dust-separating plate 11. As the particle-laden gas passes over the raised edges or lips 20 of the perforations 19 and changes direction to pass through the openings 19, the heavier particles bounce from the lips 20 and are carried by inertia, because of their heavier weight, past the openings 19 and out through the blow-down duct 14. Thus, the gas passing out through the blow-down outlet or duct 14 consists of a small percentage of the original gas volume, but a large percentage of the initial dust or other particles in the system. The cleaner gas passing through the dust-separating plate 11 is then carried away by the clean-gas outlet duct 13.

It may be seen that the efficiency and operation of such a dust separator depends upon many elements. The pressure loss through the dust separator depends upon the ease with which air passes from the inlet duct 10 to the outlet duct 13. Since low pressure loss is preferable, the total cross-sectional area of the perforations 19 in the dust-separating plate 11 should be maximum, considering other requirements. On the other hand, the more or larger perforations 19 there are, the more difficult it is to keep the dust or particles from passing through the plate 11 rather than out through the blow-down duct 14. Although only one plate 11 is shown in Fig. 1, more than one plate may be used in one separator simultaneously, as by installing plates facing each other about the inlet duct.

The dust-separating surfaces of the present invention may consist of a variety of surfaces other than flat plates. Surfaces such as a truncated cone or a pyramid are examples of surfaces which are satisfactory if the surface elements are placed at a proper angle, $\theta$, to the incoming dirty gases.

Fig. 2 illustrates a dust-separating system utilizing a conelike structure 21 as the dust-separating element. The dust separator of Fig. 2, similar to that of Fig. 1, consists essentially of an inlet duct 10' for the dirty, particle-laden gases, a dust-separating cone 21, a clean-gas outlet chamber 12', a clean-gas outlet duct 13', and a blow-down duct 14' for carrying away the gas with a high dust concentration. The dust-separating cone 21 completely separates the inlet duct 10' and the blow-down duct 14' from the outlet chamber 12' and outlet duct 13'. The inlet duct 10' enters directly into the large end of the cone 21 at 15', the cone 21 being such that the incoming dirty gases strike the surfaces of the cone 21 at an angle $\theta$, about 5–10 degrees. The blow-down duct 14' is situated at the small end 16' of the cone 21 and leads directly off the inner side 17' of the cone 21, as, of course, does the inlet duct 10'. The outlet chamber 12' and outlet duct 13' are situated on the other side 18' of the dust separating cone 21.

Particle-laden air or gas enters through the inlet duct 10' and passes through the openings or perforations 19' of the dust-separating cone 21. As the gas passes over the raised edges or lips 20' of the perforations 19' and changes direction to pass through the perforations 19', the heavier particles bounce from the lips 20' and are carried by inertia, because of their heavier weight, past the openings 19' and out through the blow-down duct 14'.

Thus, the gas passing out through the blow-down outlet or duct 14' consists of a small percentage of the original gas volume, but a large percentage of the initial dust or other particles in the system. The cleaner gas passing through the dust-separating cone 21 is then carried away through the clean-gas outlet chamber 12' and duct 13'.

As illustrated by Figs. 3 and 4, the dust-separating element of the present invention comprises a perforated surface with each perforation 19 of the surface being approximately the same width in any direction through its midpoint (e. g., a circle, equilateral polygon, fat ellipse, etc.), the perforations 19 being placed in rows which are diagonally offset, i. e., staggered and not in the line, and the upstream side of each perforation 19 being raised in a lip 20. Fig. 3 illustrates use of a substantially circular perforation 19 with a diameter $a$ with a raised lip 20 on the side of the perforation 19 in the direction of the inlet air duct, or upstream side. Fig. 3 also illustrates the preferred staggered placement of the perforations 19 in a dust-separating surface element. Fig. 4 illustrates a section (4—4 of Fig. 3) through the perforation 19 and lip 20, the lip 20 being of height $b$.

The plate or other separator element used may be perforated and a lip formed on each perforation by means of a one-step punch method. If proper dies are used, a roughly semicircular lip of desired height may be raised as the punched holes or perforations are put in the plate.

It is preferred for best separator characteristics that the lip height be substantially less than the diameter of a circular hole or the dimensions through the midpoint of a noncircular perforation, i. e., no more than approximately one-half or two-thirds of such a dimension. For circular perforations of $3/16$–$1/4$-inch diameter, a lip height of $1/16$–$1/8$ inch is preferred. Thus, the ratio of lip height to diameter is preferred to be from about 1:4 to about 2:3.

It is also preferred that the perforations be spaced as closely to each other as is practicable, say, a spacing distance approximately equal to the diameter for circular perforations.

Because of the complex nature of the flow of gas and particles around and through dust-separating elements, an accurate theoretical analysis of performance of the separators is difficult. Two important factors which influence a separation of particles from a gas stream are the inertia of the particles and the bouncing action of the particles away from the lips or raised edges. This bouncing action of the particles after they strike the lips tends to keep the particles from passing through the perforations, while the drag forces of the air which does pass through the perforations tend to carry the particles with the air. High rates of gas flow with sharp changes in direction of the gas as it passes through the perforations maximizes the bouncing action, providing for more efficient particle separation. The bouncing action of particles away from the separating surface is dependent upon the velocity of the gas along the separating surface, the angle at which the particles strike the lips and the size, the shape, and the resiliency of the particles. On the other hand, low velocity through the perforations is desirable to minimize the drag forces tending to carry the particles through the perforations.

A major consideration in dust-separator design is the elimination of dust accumulation tending to clog the perforations in the dust-separating element and thus lower the efficiency of the separator. Work was done to determine if the electrostatic charges, which necessarily occur when particles strike each other or duct walls, could be used to prevent the dust build-up. For this work, a section of a louvered plate was electrically insulated from the dust separator and tests showed that the particles which adhered to the plate were charged electrically. Fly ash used in the experiments carried a positive charge and cement a negative charge. While using each of these dusts in air, both negative and positive potentials as high as 9000 volts were used to charge the insulated portion with no apparent influence on the amount or the nature of the dust accumulation. It was concluded that, although electrostatic forces may affect the accumulation of dust, the build-up could not be prevented effectively by charging the plate.

Also, a plate was tested with one portion of the plate coated with tetrafluoroethylene (Teflon) and another with a baked enamel to compare the clogging and ease of cleaning of these surfaces with one of steel. Teflon surfaces have been observed to resist the accumulation of dust under some conditions. While the enamels have electrical properties which might affect the performance if static charges were important, there was no significant difference in the build-up or ease of cleaning between any of the surfaces. The similarity of the shape of the deposits is further evidence that the accumulation of dust is primarily dependent upon the flow pattern. Thus, it is seen that the cause of dust accumulation is the existence in the air-flow pattern across the face of the dust-separating plate or cone of points of zero air velocity, or stagnant points. In order to eliminate serious dust-accumulation problems then, it is seen that each stagnant point must either be eliminated or placed in such position that the dust build-up is self-cleaning or self-limiting because of changes in the location of stagnant points as the dust builds up.

A dimensionally similar model of a dust-separating system was built with acrylic resin (Lucite) so that water-flow patterns around various designs could be studied to determine if a self-cleaning separator could be made. The model was ten times the size of air prototypes and full similarity was obtained by using water flow rates so that the Reynolds number of the flow rate of the model was equal to that in the air prototypes. Black ink was injected into the water at critical locations so that the flow patterns were made visible.

With louver-type separators, the flow was observed to be nearly stagnant across the faces of the louvers about midway between the upstream and downstream edges. If stagnant points are transferred from the surface of the louver to the edge, dust does not accumulate in sufficient quantities to hinder the operation of the separator, for the dust is continually being swept away. To study the locations of stagnant points, various configurations of separator elements were made and the water-flow patterns around them were observed.

Then various perforation designs for dust-separator plates were tested by running dust-filled air through a full-scale separator. The collection efficiency was determined from the ratio of the weight of dust collected in a secondary collector hopper to that fed into the main air stream. Fractional efficiency data were calculated from size analyses of the dust fed and that collected. The pressure loss was measured with static-pressure or total-pressure tubes at the separator inlet. It was found that the pressure loss and the collection efficiency were best when the holes were staggered in the direction of the air stream rather than in line, and when the holes were located as close as practicable to provide the largest flow area. The designs with staggered holes were self-cleaning.

For three designs with 1/4-inch diameter perforations having flow areas of 147, 196, and 270 square inches, respectively, the corresponding static pressure losses were 2.1, 1.8, and 1.2 inches of water. These data show a decrease in pressure loss with increased flow area and no detriment in collection efficiency was observed with increasing flow area. These findings seem to confirm the fact that the separating action is a combination of particles bouncing from the lip, and the drag on the particle by the air flowing through the holes. With the larger flow area, the velocity of air flow and the drag forces tending to carry the particles through the holes would be less, while the velocity along the plate which would influence the impact of the particles upon the hole lip would not be changed. On the other hand, the number of holes is greater for a larger flow area and, thus, this larger flow area also increases the probability that particles will be carried through the holes.

An increase in lip height for 3/16-inch-diameter holes from 1/16 inch to 1/8 inch resulted in slightly higher collection efficiency but also higher pressure loss for the higher lip. Very little difference in performance was found between hole sizes of 1/4, 3/16, and 1/8 inch.

The separating action concentrates the dust into a small volume of gas which is designated the blow-down gas. Because the dust must be removed from the blow-down gas with a secondary collector, the blow-down gas rate should be as low as possible. On the other hand, the efficiency of the plate depends upon the flow along the plate which, at the downstream end, is the blow-down flow. For this reason, higher collection efficiencies are obtained with higher blow-down rates. Therefore, the selection of blow-down rate would depend upon the desired performance of the separator and the size of the secondary collector equipment which could be economically used.

Tests with various rates of blow-down showed that the collection efficiency for louver-type separators increased linearly for blow-down rates between 2 and 9 percent of the total flow. With the perforated designs, the efficiency dropped rapidly with decreasing blow-down rates below 5 percent and did not increase appreciably when the rate was increased from 6 to 10 percent. There was no difference in performance between respective blow-down areas of 5 and 10 percent of the inlet area of the separator.

An element which affects the efficiency of the dust separator system is the accessibility of the particles in the gas to the perforations in the dust-separating plate. If the angle ($\theta$ of Fig. 1) of the plate with respect to the inlet flow is minimized and the height ($b$ of Fig. 4) of the louver or lip at the side of the perforations nearest the air inlet opening is made larger, the particles in the gas have more possibility of striking the lips or louvers and bouncing off into the blow-down duct, and have correspondingly less opportunity to pass out through a perforation. However, when $\theta$ is approximately 5–10 degrees, a 1/16–1/8-inch-lip height is sufficient for 3/16–1/4-inch-diameter perforations.

Tests with the perforated designs under laboratory conditions definitely showed that these designs are self-cleaning when the holes are staggered. The fly ash used in the experiments did not adhere to the surface under any conditions. With cement a small amount of dust accumulated on the downstream edge of the holes at the lower air rates; but these deposits did not affect the pressure drop and soon reached a stable condition so that there was no indication that the holes would become clogged. Some dust accumulated on the downstream side of the plates but this also did not hinder the performance of the separator. The curvature of the lip prevents a stagnation point on it so that the only region of lower velocity is at the downstream edge of the holes. This downstream edge of the holes lying in the plane of the separating surface clearly minimizes stagnant points. The small deposits formed at this edge are due to the stagnant point situated at the sharp dividing point between the air going through the holes and that which passes over the holes. But a stable self-cleaning condition is soon reached so that the build-up does not progress and clog the holes.

In pilot plant tests the difference between the self-cleaning action of the louver-type separators and the hole design of the present invention was remarkably evident. The pressure drop with the louver design increased rapidly at the beginning of each test run because the louvers became clogged. However, during the entire series of tests the plate with the circular perforations was still clean on the inlet side except for very small deposits around the downstream edge of the holes. No decrease in separator efficiency or performance was indicated nor was there any sign that the build-up would become troublesome.

The semi-circular, smoothly curved lip formed with the substantially circular holes greatly aids in creating a favorable air-flow pattern for resistance to dust build-up. Stagnant points are greatly minimized.

Thus, laboratory and field tests prove that the design of the present invention is self-cleaning under conditions where other separators would soon become clogged if not continuously cleaned.

It will be understood, of course, that while the forms of the invention herein shown and described constitute the typical or preferred embodiments of the invention, it is not intended herein to illustrate all of the possible equivalent forms or ramifications of this invention. It will also be understood that the words used are words of description rather than of limitation and that various changes, such as changes in shape, relative size, and arrangement of parts, may be substituted without departing from the spirit or scope of the invention herein disclosed.

What is claimed is:

1. In a dust separator comprising a gas inlet, a blow-down duct, and a clean-gas outlet: a perforated surface separating said inlet and said blow-down duct from said outlet, the perforations in said surface being substantially circles of about 3/16 inch to about 1/4 inch in diameter; and a substantially semicircular curved lip on each said perforation protruding from about 1/16 inch to about 1/8 inch from said surface, said lip being positioned on each said perforation so as to deflect particles in an incoming gas stream away from said perforation.

2. The dust separator of claim 1 in which the perforated surface is situated at a small angle from parallel to the gas inlet.

3. The dust separator of claim 2 in which the small angle is from about 5 to about 10 degrees.

4. In a dust separator comprising a gas inlet, a blow-down duct, and a clean gas outlet: a perforated dust separating surface separating said inlet and said blow-down duct from said outlet and containing substantially circular perforations; the upstream side of each said perforation being characterized in structure by a raised lip of substantially less height than the diameter of said perforation, said lip being positioned on each said perforation on said upstream side so as to deflect particles in an incoming gas stream away from said perforation; and the downstream side of each said perforation being characterized in structure by an edge lying in the plane of said surface.

5. The dust separator of claim 4 in which the ratio of lip height to perforation diameter is from about 1:4 to about 2:3 and in which the perforations are situated in staggered rows.

References Cited in the file of this patent

UNITED STATES PATENTS

| 1,360,929 | Gough | Nov. 30, 1920 |
| 2,571,331 | Blomen | Oct. 16, 1951 |
| 2,703,519 | Esselman et al. | Mar. 8, 1955 |
| 2,709,500 | Carter | May 31, 1955 |

FOREIGN PATENTS

| 373,127 | Italy | July 20, 1939 |
| 388,627 | Great Britain | Mar. 2, 1933 |
| 641,143 | France | Apr. 10, 1928 |

UNITED STATES PATENT OFFICE
CERTIFICATE OF CORRECTION

Patent No. 2,876,862 — March 10, 1959

John D. Hummell

It is hereby certified that error appears in the above numbered patent requiring correction and that the said Letters Patent should read as corrected below.

In the grant, lines 1, 2 and 3, for "assignor to Battelle Memorial Institute, of Columbus, Ohio, a corporation of Ohio," read -- assignor, by mesne assignments, to Pangborn Corporation, of Hagerstown, Maryland, a corporation of Maryland, --; line 12, for "Battelle Memorial Institute, its successors" read Pangborn Corporation, its successors --; in the heading to the printed specification, lines 3 and 4, for "assignor to Battelle Memorial Institute, Columbus, Ohio, a corporation of Ohio" read -- assignor, by mesne assignments, to Pangborn Corporation, Hagerstown, Md., a corporation of Maryland --.

Signed and sealed this 30th day of June 1959.

(SEAL)
Attest:
KARL H. AXLINE
Attesting Officer

ROBERT C. WATSON
Commissioner of Patents